United States Patent
St. Denis et al.

(10) Patent No.: US 7,430,173 B2
(45) Date of Patent: Sep. 30, 2008

(54) DATA TRAFFIC POLICER

(75) Inventors: Bernard St. Denis, Nepean (CA); Sitaram Patro, Ottawa (CA); Stuart White, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 846 days.

(21) Appl. No.: 10/820,776

(22) Filed: Apr. 9, 2004

(65) Prior Publication Data

US 2005/0226155 A1 Oct. 13, 2005

(51) Int. Cl.
H04L 12/54 (2006.01)

(52) U.S. Cl. .................. 370/235.1; 370/229; 370/428

(58) Field of Classification Search ....... 370/229–235.1
See application file for complete search history.

(56) References Cited

U.S. PATENT DOCUMENTS

| | | | | |
|---|---|---|---|---|
| 5,596,576 A * | 1/1997 | Milito | ........................ | 370/450 |
| 6,052,379 A * | 4/2000 | Iverson et al. | ................ | 370/442 |
| 6,381,214 B1 * | 4/2002 | Prasad | ...................... | 370/230.1 |
| 6,801,500 B1 * | 10/2004 | Chandran | ................. | 370/230.1 |
| 7,236,458 B2 * | 6/2007 | Lee et al. | ..................... | 370/230 |
| 2004/0151184 A1 * | 8/2004 | Wang et al. | ............... | 370/395.2 |

* cited by examiner

*Primary Examiner*—Chi H. Pham
*Assistant Examiner*—Phuc Tran

(57) ABSTRACT

A data traffic policer includes a classifier for separating a packet stream in accordance with class, a first bucket for a first traffic class representing a first transmission rate and a first burst capacity and a plurality of second buckets for a plurality of second traffic classes representing a corresponding second transmission rates and a second burst capacities, the plurality of second buckets being nested within the first bucket thereby being subordinate to the rate and capacity of the first bucket, with the rate of the second bucket being disabled when a fill condition exists in the first bucket. The second bucket for a second traffic class may include a plurality of buckets for a corresponding plurality of traffic classes, with each bucket of the plurality of buckets having a corresponding capacity and rate. The rate defined as a corresponding weight.

24 Claims, 2 Drawing Sheets

DATA TRAFFIC POLICER

FIELD OF THE INVENTION

The present invention relates to data traffic policers and is particularly concerned with token or leaky bucket policers.

BACKGROUND OF THE INVENTION

Data traffic may include several forwarding classes (emission priorities) that require different treatment on access to the data network. Data may also be assigned various levels of discard priority, sometimes designated by colour, for example green, yellow and red for high, medium and low priority, respectively. Both of these priorities need to be taken into account by data network entities involved in traffic management. Such entities include schedulers, data shapers, and policers. While schedulers and data shapers effect changes in the makeup of the data stream, policers monitor the data stream and identify violations of the constraints imposed on the data network, for example throughput. Because of this difference, policers provide an opportunity to ensure fairness with respect to network resource utilization.

Known policers have tried to use a serial or a hierarchical configuration to provide for both emission priority and discard priority. However in such configurations information can be lost between policers, thereby adversely affecting the policer's fairness. Hence, it would be desirable to provide a policer that maintains fairness.

SUMMARY OF THE INVENTION

An object of the present invention is to provide an improved data traffic policer.

In accordance with an aspect of the present invention there is provided a data traffic policer comprising a classifier for separating a packet stream in accordance with class, a first bucket for a first traffic class representing a first transmission rate and a first burst capacity and a second bucket for a second traffic class representing a second transmission rate and a second burst capacity, the second bucket being nested within the first bucket thereby being subordinate to the rate and capacity of the first bucket, with the rate of the second bucket being disabled when a fill condition exists in the first bucket.

In accordance with another aspect of the present invention there is provided a method of data policing comprising the steps separating a packet stream in accordance with class, representing a first traffic class as a first transmission rate and a first burst capacity, and representing a second traffic class as a second transmission rate and a second burst capacity being subordinate to the rate and capacity of the first traffic class, with the rate of the second traffic class being disabled when a fill condition exists for the first traffic class.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 1:
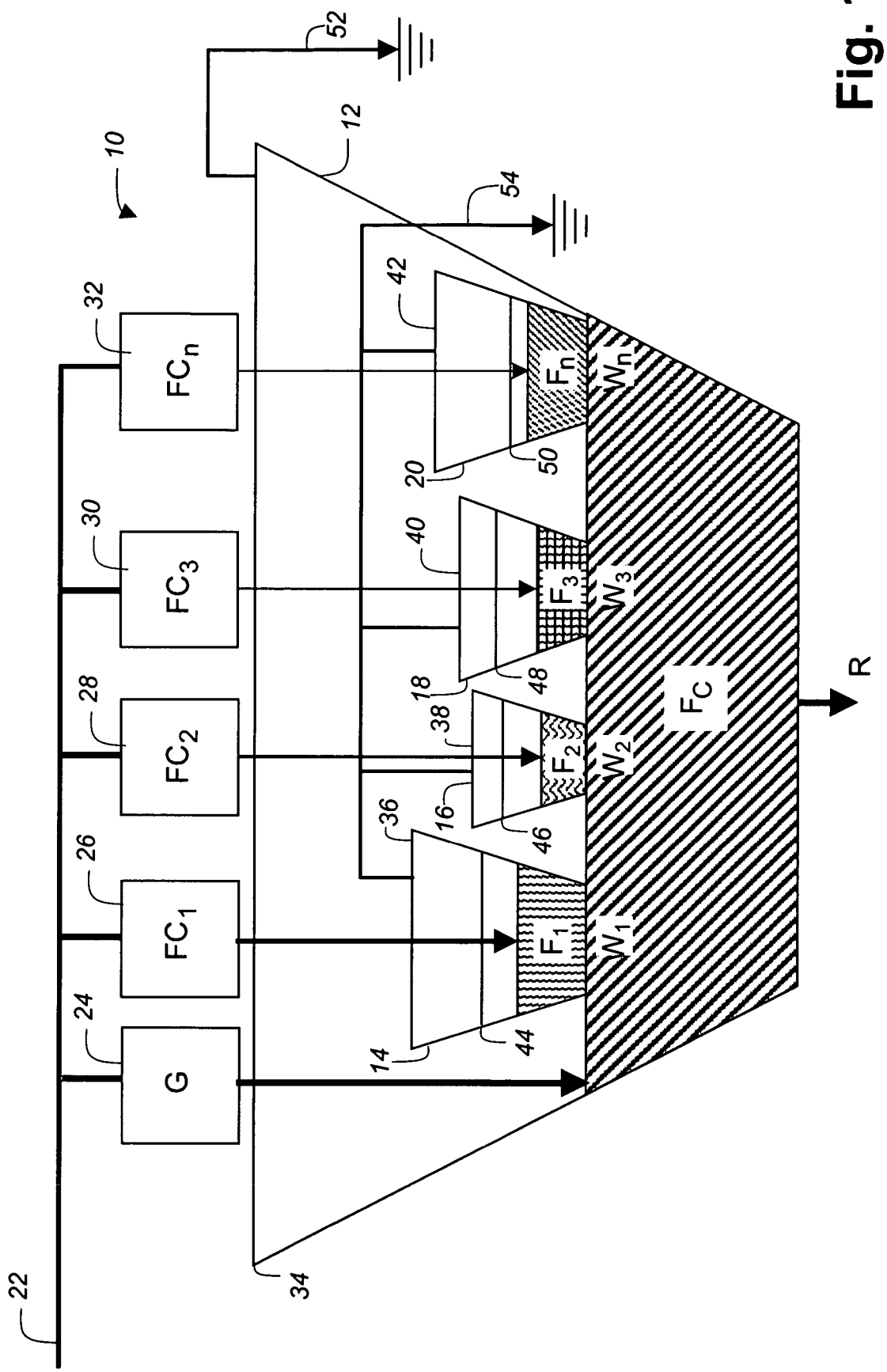
FIG. 1 illustrates a data traffic policer in accordance with an embodiment of the present invention.

Referring to FIG. 1, there is illustrated in a block diagram a data traffic policer in accordance with an embodiment of the present invention. The data traffic policer 10 includes a first leaky bucket 12 having a rate R and a plurality of second leaky buckets 14, 16, 18 and 20 for receiving respective portions of data traffic from an input 22 via a corresponding plurality of classes 24, 26, 28, 30 and 32. The first leaky bucket 12 is fed by a committed traffic class 24, labeled green (G) for convenience. Second leaky buckets 14, 16, 18, 20 are fed by respective forwarding classes $FC_1$, $FC_2$, $FC_3$, . . . $FC_n$. The green traffic directly fills the first leaky bucket, as illustrated with a green traffic fill level $F_c$. The first leaky bucket 12 has a fill limit $B_c$ 34, visually represented by the upper edge of the bucket.

Similarly, each of the second leaky buckets 14, 16, 18, 20 has a respective limit $B_{si}$, however they also have a collective limit $B_e$ (for excess), such that: $B_e$=sum $B_{si}$, and $B_e$<$B_c$. Each of the second leaky buckets may also have separate limits for each of the discard classes (colours), for example $B_{ri}$ for red and $B_{yi}$ for yellow. Thus, for second bucket 14, the bucket limit for red $B_{r1}$ may be the bucket upper edge 36, while bucket limit for yellow $B_{y1}$ may be a lower limit 44. Similarly, for the second bucket 16, the bucket limit for red $B_{r2}$ may be the bucket upper edge 38, while bucket limit for yellow $B_{y2}$ may be a lower limit 46. Similarly, for the second bucket 18, the bucket limit for red $B_{r3}$ may be the bucket upper edge 40, while bucket limit for yellow $B_{y3}$ may be a lower limit 48. Similarly, for the second bucket 20, the bucket limit for red $B_{rm}$ may be the bucket upper edge 42, while bucket limit for yellow $B_{yn}$ may be a lower limit 50. Each of the second buckets also has assigned a weight $W_i$ that is used to determine the rate at which they leak, once the committed traffic has been satisfied.

Figure 2:
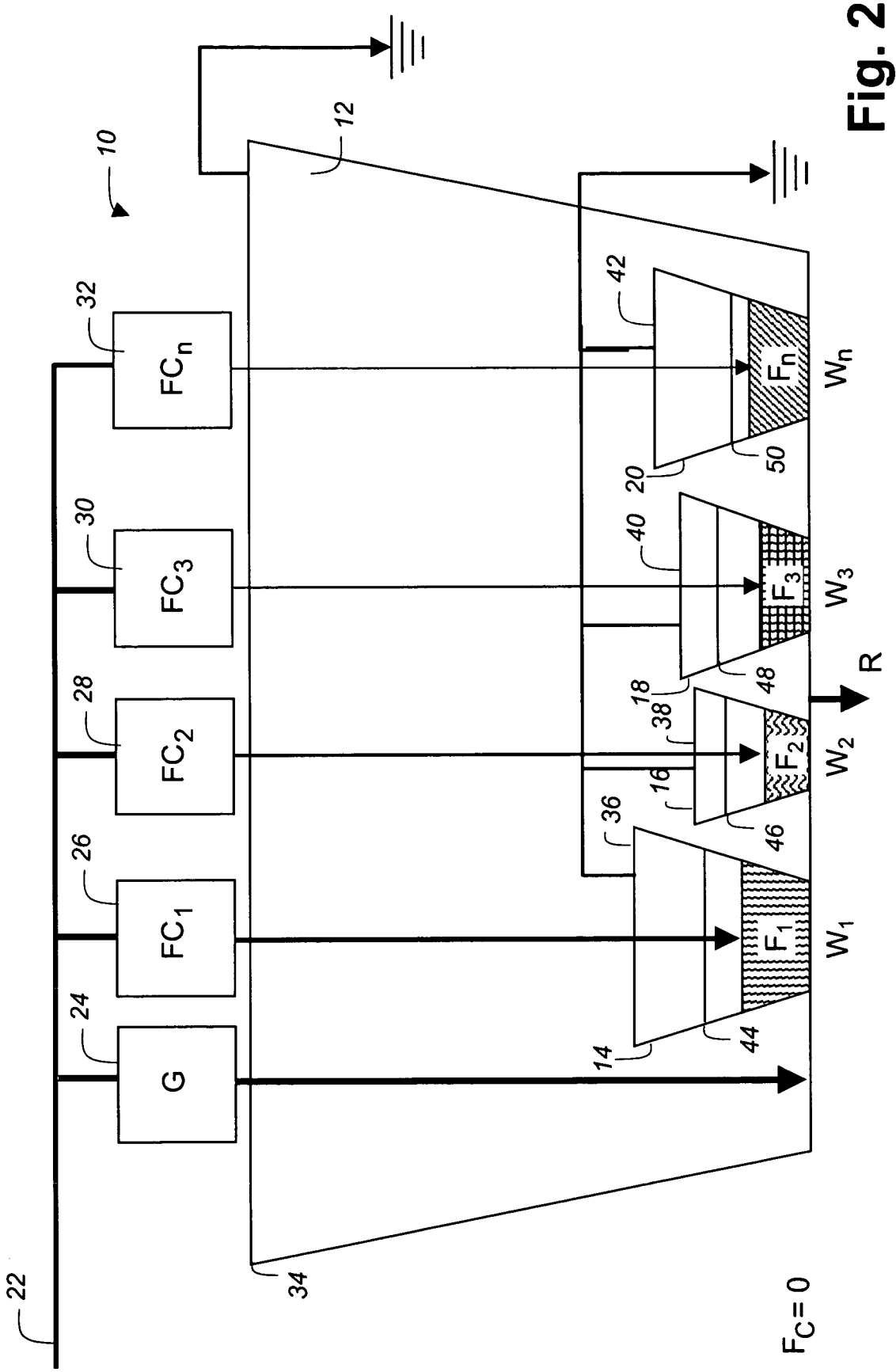
FIG. 2 illustrates in a block diagram the data traffic policer of FIG. 1 with a different fill state.

Operation of the data traffic policer is described with reference to FIGS. 1 and 2. In operation, traffic received on data input 22 is split according to class. Committed traffic 24 is applied directly to the first leaky bucket 12. As long as $F_c$ is non-zero, the rate R is completely consumed by the committed traffic. Thus, as shown in FIG. 1, the fill levels of the second buckets 14-20 does not go down and likely increases with $F_c$>0. Once the committed traffic has been satisfied, as illustrated in FIG. 2, the second leaky buckets 14-20 can begin to leak at their respectively weighted rates. Consequently, the respective fill levels $F_1$, $F_2$, $F_3$, . . . $F_n$, begin to lower, however, as soon as any committed (green) traffic 24 arrives, it is applied directly to the first leaky bucket 12, $F_c$ becomes non-zero and the second buckets 14-20 are prevented from further emptying.

The above description is a view of how the data traffic policer in accordance with embodiments of the present invention can be considered conceptually. Implementation of this view may be in the form of an algorithm applied to the data network to effect the data traffic policer. The following tables, Table A and Table B, provide the static configuration parameters and dynamic parameters needed in an implementation of the policer algorithm.

TABLE A

Static Configuration Parameters

| Symbol | Definition |
|---|---|
| R | Rate of the aggregate policer |
| $B_c$ | Bucket limit for committed (green) traffic |
| $B_e$ | Bucket limit for non-committed traffic $B_e$ < $B_c$ |
| $W_i$ | Weight for each FC = 1, 2 . . . n |
| $B_{yi}$ | Bucket limit for yellow traffic FC = 1, 2 . . . n |
| $B_{ri}$ | Bucket limit for red traffic FC = 1, 2 . . . n |

Note:
$B_{yi}$ could be configured as a percentage of $B_{ri}$, thereby only requiring a single parameter for all FCs.

TABLE B

Dynamic Parameters

| | |
|---|---|
| $F_c$ | Fill level of committed (green) traffic |
| $F_i$ | Fill level of excess (non-green) traffic of FCi |
| F | Fill level of aggregate policer ($F_c$ + sum ($F_i$)) |

Input:
  Per-packet: Colour (Green, Yellow or Red), FC (1 ... N), Packet Size L in bytes
  Tc=Current Time
Static Configuration:
  R=Rate of the aggregate policer
    Here Rate may be Bytes per millisecond (therefore 8 Mbps translates to R=1000 Bytes per millisecond)
  Bc=Bucket limit for green (committed) traffic
  Be=Bucket limit for non-green (excess) traffic (Be<Bc)
  Wi=Weight of each FC, i=1 ... N
  Byi=Bucket limit for yellow traffic of FC, i=1 ... N
  Bri=Bucket limit for red traffic of FC, i=1 ... N
  Implementation note: Byi could be implemented as a percentage of Bri, thereby requiring only a single parameter for all FCs. A further simplification would be to set Bri the same as Byi.

Dynamic Parameters:
  Fc=Fill level of green (committed) traffic
  Fi=Fill level of non-green (excess) traffic of FCi
  F=Fill level of aggregate policer (same as Fc+all Fi)
  T=Last time packet was received (for example stored in milliseconds). An actual implementation may use microseconds for greater accuracy.
  All fill parameters are initialized to 0.
  Algorithm:
  Leakage of Buckets:
    The aggregate fill level is decremented at the rate of R. That is: decremented by D=R*(Tc−T).
    D is divided between the Fc and Fi's as follows:
    If Fc>=D, Fc=(Fc−D) and Fi's are unchanged. In other words, as long as Fc is non-zero the rate R is applied to Fc.
    If Fc<D, Fc=0, and the residue (D−Fc) is divided between the Fi's according to their weight.
    Given the above condition of applying R first to Fc, what this means is that for some time To, the rate R was applied to Fc until Fc=0, then from To until time Tc, R was applied to the remaining buckets Fi. How this is done is implementation specific (for e.g., a bulk WRR could be used).
    The following example is provided to demonstrate the leaky bucket algorithm.
    Let T=0, Fc=10 kB and R=1000 B/ms a) at $Tc = 1$ ms $Fc = Fc - D$
     $Fc = 10$ kB $- 1$ kB
     $= 9$ kB yes $Fc > D$ b) at $Tc = 5$ ms $D = 1000 \times (5 - 0) = 5$ kB
     $Fc = Fc - D$
     $Fc = 10$ kB $- 5$ kB
     $= 5$ kB yes $Fc > D$ -continued c) at $Tc = 10$ ms $D = 1000 \times (10 - 0) = 10$ kB
     $Fc = Fc - D$
     $Fc = 10$ kB $- 10$ kB
     $= 0$ kB yes $Fc = D$ d) at $Tc = 11$ ms $D = 1000 \times (11 - 0) = 11$ kB $Fc < D$
     $Fc = 0$
     Residue $= D - Fc = 11$ kB $- 10$ kB
     $= 1$ kB to be applied to bucket fill levels $Fi$
     according to weights $Wi$.

Hence, the committed traffic uses the entire leaky bucket rate R as long as Fc is non-zero. However once the fill decrement D is greater than Fc, any residue D−Fc is used to decrement the other buckets with fill levels Fi When a new packet arrives, T is updated with value of Tc (i.e: T=Tc) and the buckets are incremented in accordance with the following.
Incrimination of Buckets:
Green packet: If F<Bc,/* Packet is conforming */
{
F=F+L;
Fc=Fc+L;
}
/* Else packet is non-conforming */
Yellow packet, Class i: if F<Be AND Fi<Byi/* Packet is conforming */
{
F=F+L;
Fi=Fi+L;
}
/* Else packet is non-conforming */
Red packet, Class i: if F<Be AND Fi<Bri/* Packet is conforming */
{
F=F+L;
Fi=Fi+L;
}
/* Else packet is non-conforming */
/* End of HWP description */

If a packet is nonconforming, various options are available with regard to determining the behavior of the policer. For example, the policer may mark the packet (in which case it is counted in the bucket) for discard in the event of downstream congestion conditions. Alternatively, the policer may immediately discard the packet, in which case it would not contribute to the bucket count.

While the embodiment of the present describe herein above uses leaky buckets, it will be appreciated by those of ordinary skill in the art that an alternative embodiment could be provided using token buckets.

Also in the figures a two-level nested bucket hierarchy has been presented for simplicity of the description, however it should be appreciated that a plurality of levels is also possible.

Numerous modification, variations and adaptations may be made to the particular embodiments of the invention described above without departing from the scope of the invention, which is defined in the claims.

What is claimed is:

1. A data traffic policer comprising:
   a classifier separating a packet stream into a first class of traffic to be represented by a first transmission rate and a first burst capacity, and a second class of traffic to be represented by a second transmission rate and a second burst capacity;
   a first bucket representing the first transmission rate and the first burst capacity; and
   a second bucket representing the second transmission rate and the second burst capacity, the second bucket being subordinate to the first transmission rate and the first burst capacity of the first bucket, and the second transmission rate set to zero when a fill condition of the first bucket is above a predetermined level.

2. A data traffic policer as claimed in claim 1 wherein the first bucket and/or the second bucket is a leaky bucket.

3. A data traffic policer as claimed in claim 2 wherein the first class of traffic and/or the second class of traffic has a discard priority.

4. A data traffic policer as claimed in claim 2 wherein the first class of traffic and/or the second class of traffic has an emission priority.

5. A data traffic policer as claimed in claim 2 wherein the first-class of traffic and/or the second class of traffic has a discard priority and an emission priority.

6. A data traffic policer as claimed in claim 1 wherein the first bucket and/or the second bucket is a token bucket.

7. A data traffic policer as claimed in claim 6 wherein the first class of traffic and/or the second class of traffic has a discard priority.

8. A data traffic policer as claimed in claim 6 wherein the first class of traffic and/or the second class of traffic has an emission priority.

9. A data traffic policer as claimed in claim 6 wherein the first class of traffic and/or the second class of traffic has a discard priority and an emission priority.

10. A data traffic policer as claimed in claim 1 wherein the second bucket for the second class of traffic is one of a plurality of buckets for a plurality of traffic classes representing transmission rates and burst capacities, the plurality of buckets being subordinate to the first transmission rate and the first burst capacity, and the transmission rates of the plurality of buckets being set to zero when the fill condition of the first bucket is above the predetermined level.

11. A data traffic policer as claimed in claim 10 wherein the second transmission rate comprises a weight.

12. A data traffic policer as claimed in claim 1 wherein the predetermined level is zero.

13. A method of data traffic policing comprising the steps of:
    separating a packet stream into a first class of traffic to be represented by a first transmission rate and a first burst capacity, and a second class of traffic to be represented by a second transmission rate and a second burst capacity;
    representing a first class of traffic class as a first transmission rate and a first burst capacity; and
    representing a second class of traffic as a second transmission rate and a second burst capacity, the representation of the second class of traffic being subordinate to the first transmission rate and the first burst capacity, and the second transmission rate being set to zero when a fill condition of the representation of the first class of traffic is above a predetermined level.

14. A method as claimed in claim 13 wherein the representations of the first and second classes of traffic are leaky buckets.

15. A method as claimed in claim 14 wherein the first class of traffic and/or the second class of traffic has a discard priority.

16. A method as claimed in claim 14 wherein the first class of traffic and/or the second class of traffic has an emission priority.

17. A method as claimed in claim 14 wherein the first class of traffic and/or the second class of traffic has a discard priority and an emission priority.

18. A method as claimed in claim 13 wherein the representations of the first and second classes of traffic are token buckets.

19. A method as claimed in claim 18 wherein the first class of traffic class and/or the second class of traffic has a discard priority.

20. A method as claimed in claim 18 wherein the first class of traffic class and/or the second class of traffic has an emission priority.

21. A method as claimed in claim 18 wherein the first class of traffic and/or the second class of traffic has a discard priority and an emission priority.

22. A method as claimed in claim 13 wherein the step of representing a second class of traffic includes representing a plurality of traffic classes as transmission rates and a first burst capacities, the representations being subordinate to the first transmission rate and the first burst capacity, and the transmission rates of the plurality of traffic classes being set to zero when the fill condition of the first bucket is above a predetermined level.

23. A method as claimed in claim 22 wherein the second transmission rate comprises a weight.

24. A method as claimed in claim 14 wherein the predetermined level is zero.

* * * * *

UNITED STATES PATENT AND TRADEMARK OFFICE
CERTIFICATE OF CORRECTION

PATENT NO. : 7,430,173 B2
APPLICATION NO. : 10/820776
DATED : September 30, 2008
INVENTOR(S) : St. Denis et al.

It is certified that error appears in the above-identified patent and that said Letters Patent is hereby corrected as shown below:

Column 5
line 14, after "mission rate", insert --being--.

Signed and Sealed this

Twenty-third Day of February, 2010

David J. Kappos
*Director of the United States Patent and Trademark Office*